R. B. CRAIG & A. COFFMAN.
AUTOMATIC VENDING MACHINE.
APPLICATION FILED FEB. 25, 1911.

1,055,614.

Patented Mar. 11, 1913.

WITNESSES

INVENTORS,
Robert B Craig
Albert Coffman
By Knight Bros Attorneys.

R. B. CRAIG & A. COFFMAN.
AUTOMATIC VENDING MACHINE.
APPLICATION FILED FEB. 25, 1911.

1,055,614.

Patented Mar. 11, 1913.

WITNESSES

INVENTORS.
Robert B. Craig
Albert Coffman
By Knight Bros. Attorneys

Fig. 5.

R. B. CRAIG & A. COFFMAN.
AUTOMATIC VENDING MACHINE.
APPLICATION FILED FEB. 25, 1911.

1,055,614.

Patented Mar. 11, 1913.

R. B. CRAIG & A. COFFMAN.
AUTOMATIC VENDING MACHINE.
APPLICATION FILED FEB. 25, 1911.

1,055,614.

Patented Mar. 11, 1913.

WITNESSES

INVENTORS
Robert B Craig
Albert Coffman
By Knight Bros. Attorneys

UNITED STATES PATENT OFFICE.

ROBERT B. CRAIG AND ALBERT COFFMAN, OF DAYTON, OHIO, ASSIGNORS TO THE AUTOMATIC VENDING MACHINES CO., OF CLEVELAND, OHIO, A CORPORATION OF NEW MEXICO.

AUTOMATIC VENDING-MACHINE.

1,055,614. Specification of Letters Patent. Patented Mar. 11, 1913.

Application filed February 25, 1911. Serial No. 610,916.

*To all whom it may concern:*

Be it known that we, ROBERT B. CRAIG and ALBERT COFFMAN, citizens of the United States, and residents of Dayton, in the county of Montgomery, State of Ohio, have invented certain new and useful Improvements in Automatic Vending-Machines, of which the following is a specification.

The present invention relates to coin controlled machines of that type wherein a deposited coin actuates means that releases mechanism operable to vend a time printed sheet or card, as for instance, an insurance policy; and which machine embodies in its structure certain improvements on other machines of the same character for which applicants now have pending application papers for patents bearing Serial No. 465,182, dated November 30, 1908 and Serial No. 489,457, dated April 12, 1909.

The improvements in the present invention relate to the recording means and its transferring mechanism, the timing element, the printing mechanism, the releasing detent for the recorder, the coin controlled mechanism, and the severing mechanism; and have for their purpose to render these elements less complicated and simpler in operation, whereby to reduce the cost of manufacture of the machine and necessitate only the minimum amount of attention when a machine is installed.

The present machine further improves over the two aforesaid machines in that the transferring devices for the recording mechanism are provided with means for throwing the same out of operative position whereby the several character wheels of the recorder may be set to correspond with the time piece. The manually actuated mechanism of the machine is provided with an arresting device controlled through the coin actuated means, which prevents the operation of the machine beyond its prescribed vending movement. And the loading element for the recording wheels is controlled by the recorder releasing detent and has a slip driving connection with the recording wheels so as to not subject the recorder releasing detent or the recording wheels to jarring incident to the stopping of the loading element.

A machine embodying the aforesaid features and associated parts, in their preferred structure is shown in the accompanying drawings wherein:—

Figure 8:
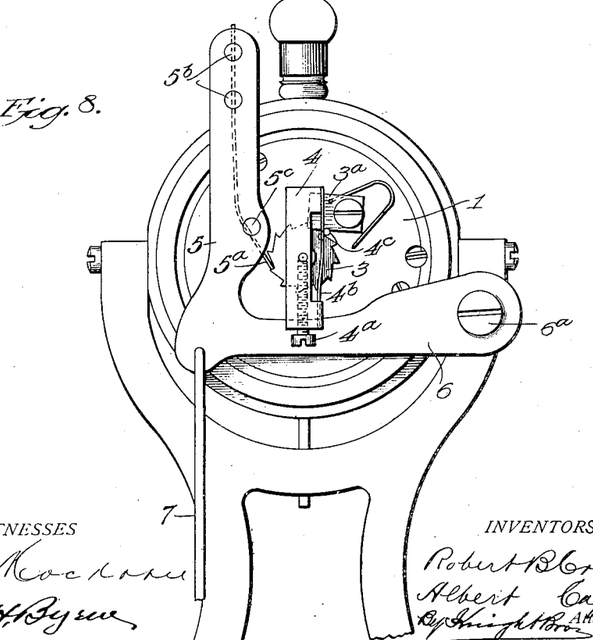
Fig. 8 is an enlarged rear elevation of the timing element.

*Time mechanism.*—This feature of the machine is constructed and operates in substantially the same manner as that described of the corresponding mechanisms in applicants' applications for patents above referred to, i. e., the time mechanism controls by releasing at predetermined intervals the recording mechanism, which control is accomplished through the medium of a detent restraining mechanism that is kept under constant tension, and releases such detent through a connection which is under constant tendency to move in the direction of releasing, so that the time mechanism restrains rather than imparts movement to the recording mechanism. To this end (see Figs. 4 and 8) the time piece 1 carries loosely mounted on its arbor 2 a ratchet wheel 3 which has driving connection with said arbor 2, through the medium of a block 4 that is fixed by a set screw $4^a$ to rotate with the arbor 2. Said block 4 carries a leaf spring $4^b$ against which normally contacts a pin $4^c$ carried by the ratchet wheel 3. There are twelve teeth upon the ratchet, thus giving each tooth the value of five minutes, and supported by said ratchet through the medium of a resilient pawl $5^a$ is a lever 5 having an arm 6 pivotally mounted on a stud $6^a$ to the machine frame. The pawl $5^a$ is secured to the lever 5 through the medium of a pair of studs 5ᵇ, and a third stud 5ᶜ limits the extent of movement of said pawl in the direction of its engaging position. Connected with the lever 5 is a spring assisted drop bar 7 which is lowered a distance proportionate to one tooth of the ratchet wheel 3 every five minutes as will be obvious, and when so lowered the pawl 5ᵃ is in position to slide off the engaged tooth and allow the arm 5 to fall, clear of the ratchet wheel and lower the bar 7 to effect the temporary release of the detent of the recording mechanism, thus permitting the recording means to be advanced a distance corresponding to five minutes under the impulse of the recorder actuating mechanism as will be explained hereinafter.

Figure 2:
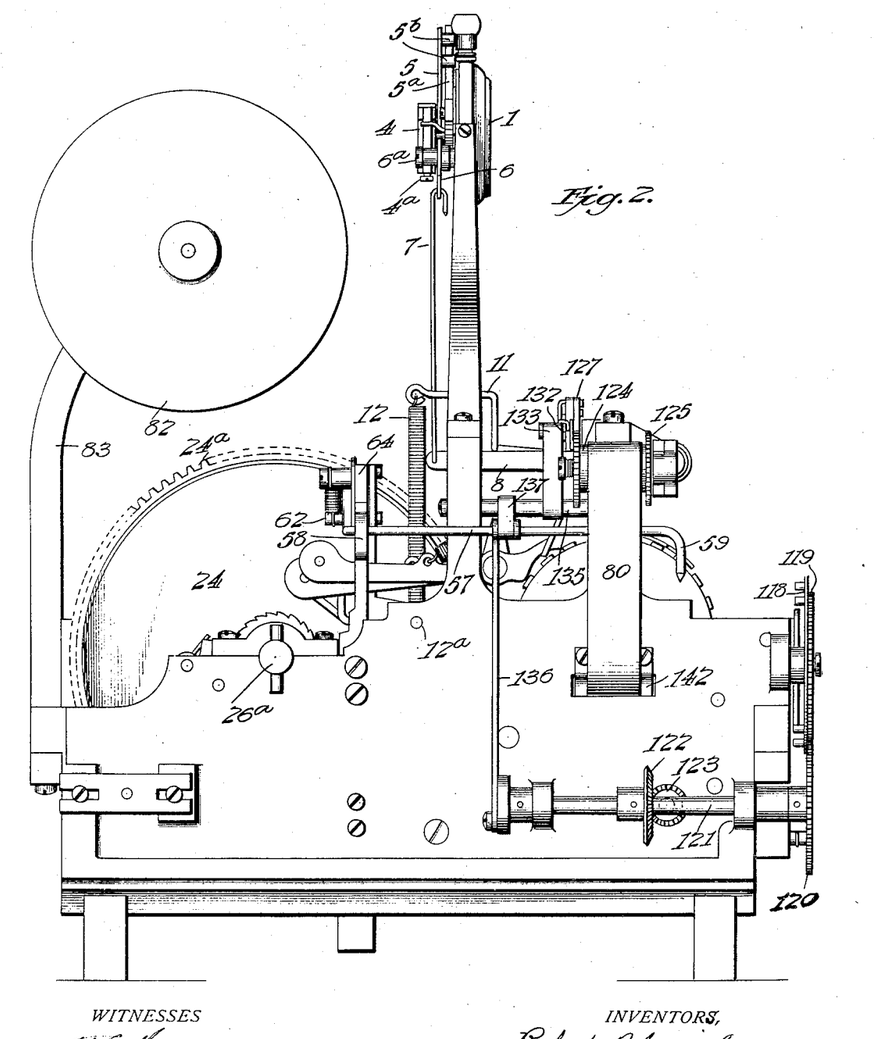
Fig. 2 is an elevation on the opposite side thereof.

On its lower end (see Figs. 2, 4 and 9) the drop bar 7 is loosely connected with the free end of an escapement lever 8, which is pivotally mounted on a stub shaft 9 that is supported by arms 10 on the machine frame, (see Fig. 3), and for exerting the downward pull on said lever 8 to actuate the timing element and incidentally to effect the release of the recording mechanism, said lever has engagement with a spring tensioned rod 11 likewise pivoted to the shaft 9 and having its spring 12 anchored to a suitable part 12ᵃ of the machine frame. On each downward movement of the drop bar 7 the detent is actuated to release the recording mechanism for the determined period, and in order that the time piece may continue under the influence of driving energy during the interval when the bar is down, or released from the wheel 3, there is provided a spring tensioned dog 3ᵃ on a fixed part of the time piece which acts in the same manner as that shown and described in the two above identified machines.

*Time recorder escapement.*—The time recorder escapement in the two applications heretofore referred to are characteristic in that such escapement is connected directly with the minutes wheel of the recording mechanism, and in those arrangements said minutes wheel is provided with twelve stops and coöperating cams, each stop having the value of five minutes. The present arrangement contemplates having the time recorder escapement arranged independently of the recording wheels.

Figure 3:
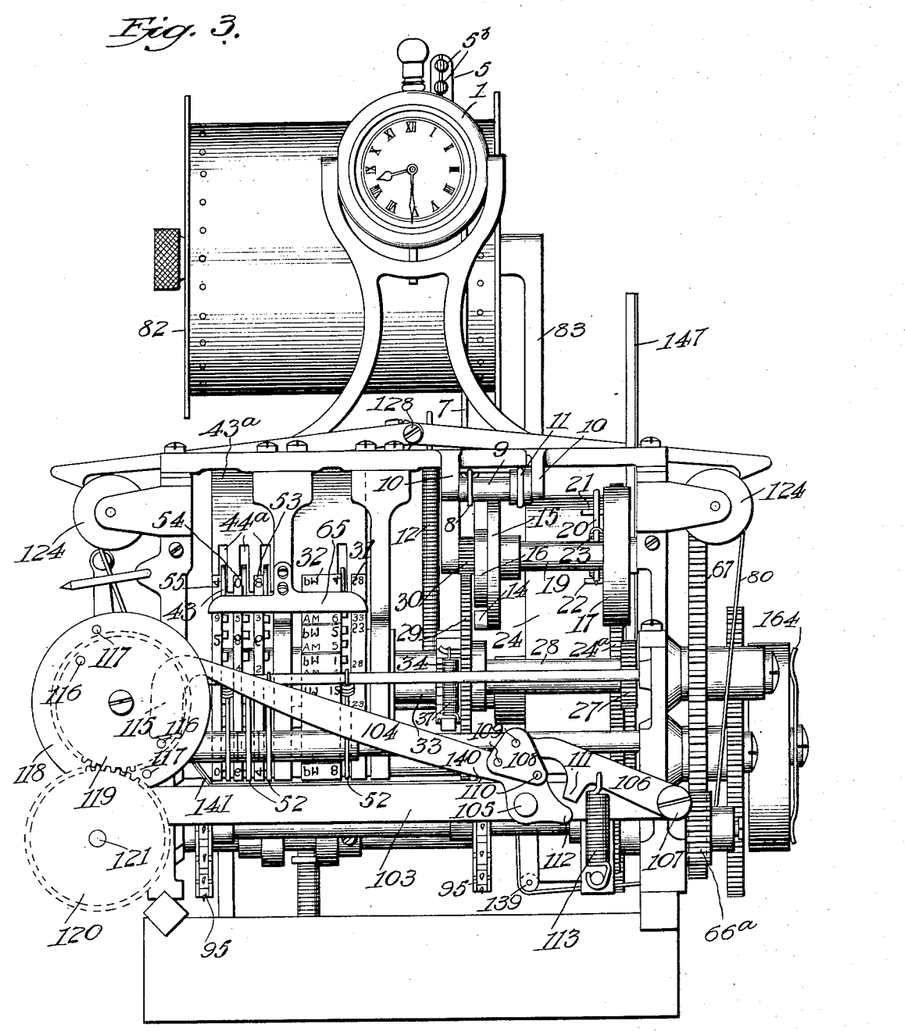
Fig. 3 is a front elevation.
Figure 5:
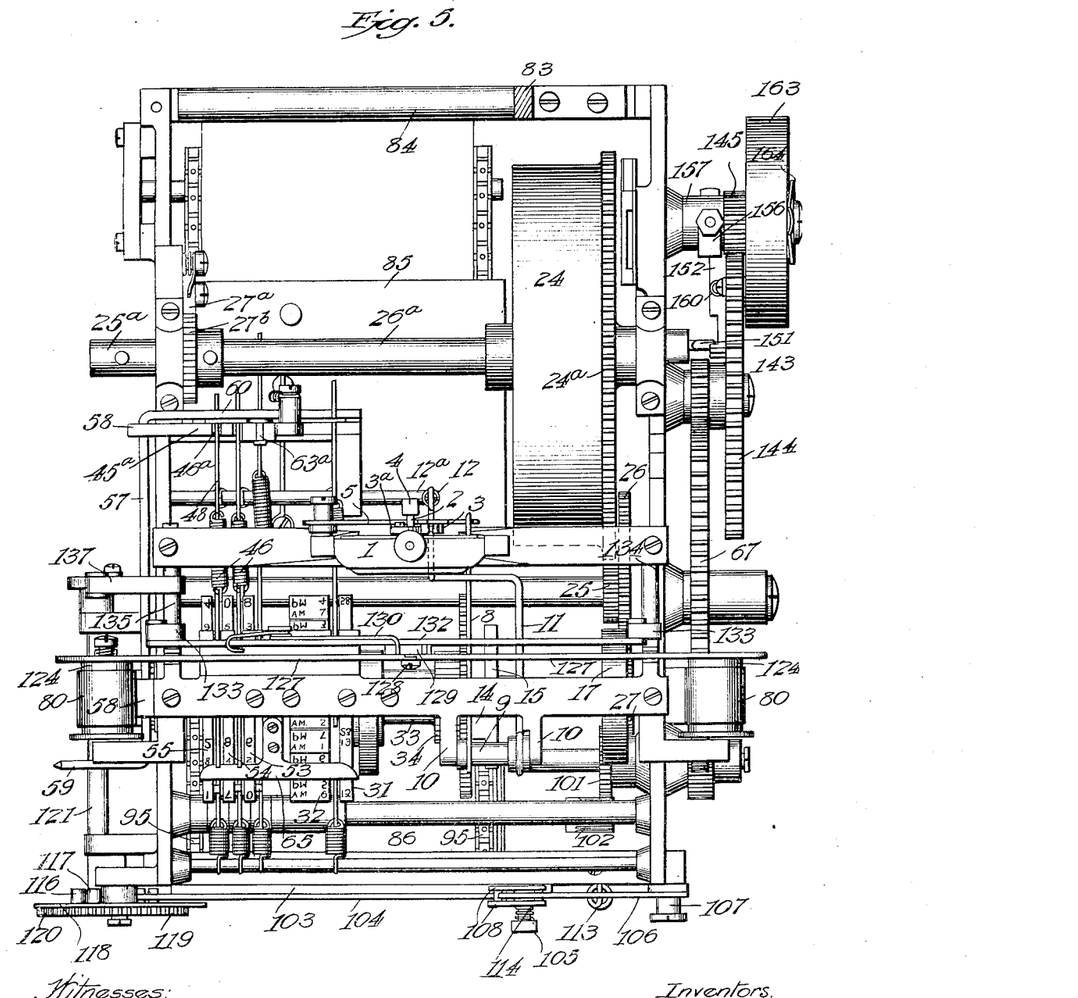
Fig. 5 is a top plan view.
Figure 9:
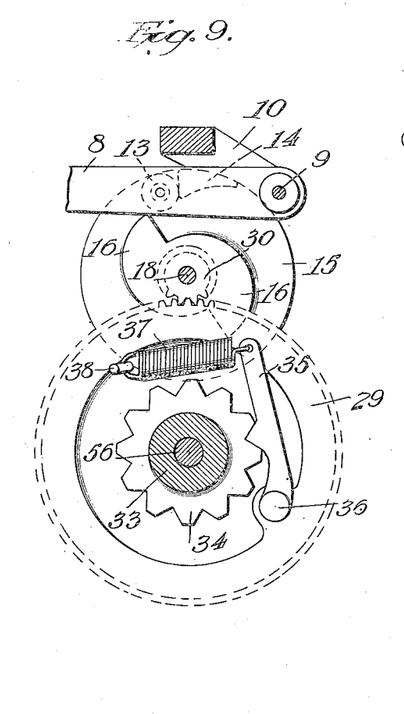
Fig. 9 is a detailed view of the escapement for the recording mechanism, released at predetermined intervals by the time element.

Referring to Figs. 3, 5 and 9 it will be seen that the escapement lever 8 carries a stop 13 normally lying in the path of segmental stops 14, of which there are two diametrically disposed and carried by the disk 15. Coöperating with each stop 14 there is a cam 16 likewise carried by the disk 15, and having its salient point located with relation to its respective stop 14 in such manner as to permit of release of the stop 13 from the stop 14 and allow the drop of the lever 8, and on the continued rotation of the disk 15 the cam 16 engages with the stop of the arm 8 and raises the arm to bring its stop 13 into the path of the stop 14. The cams 16 thus become the means for returning the lever 8 to operative position, and in performing this function, effect to restore the drop bar 7 and lever 5 to position for again engaging with the timing element.

The disk 15 is rotated a half revolution on each downward and upward movement of the escapement arm 8 which as stated occurs at five minute intervals, and for loading said disk and rendering its rotation uniform, the same is provided with an inertia wheel 17 and said wheel is so connected with the disk as to obviate the likelihood of any jarring incident to the sudden stopping of the disk and the momentum developed by the inertia body. To this end the disk 15 is pinned to the shaft 18; said disk is provided with a fixed sleeve 19, on one end of which shaft is a relatively long pin 20 adapted to engage with a pin 21 carried by the inertia wheel in the direction of operation of said disk. The inertia wheel is mounted on the shaft 18 independent of the disk 15 and the shaft 18. By reason of the connection (20—21) between the shaft 18 and the inertia wheel, the latter is permitted to have a continued movement on the stopping of the disk 15 due to the momentum developed by the inertia body, and for restoring the aforesaid connection the inertia wheel carries a second pin 22 which is connected to the pin 20 of the shaft 18 by a spring 23.

The escapement disk 15 is driven through the medium of the recorder actuating means comprising a spring actuated drum 24 having a spur gear 24ᵃ that meshes with a pinion 25 which carries a larger pinion 26, said pinion 26 meshing with a pinion 27 that carries a sleeve 28. The sleeve 28 has a fixed spur wheel 29 that meshes with a pinion 30 that is integral with the disk 15.

*Recording mechanism.*—The recording mechanism comprises, as in the case of the two machines heretofore referred to, two sections, one of which serves as a time recording means and the other as a date recording means; *i. e.*, the former records the hour and minute divisions of a day, while the latter records the numerical or day divisions of a year. As will be explained in detail hereinafter both of these recording means are actuated through the single driving motor 24, which through the gearing shown (see Figs. 5 and 6) engages with and tends to drive the minutes and meridian wheel of the series, the successive wheels of the series being driven *seriatim* by a suitable transferring mechanism, so as to shift every five minutes and thus be in position to record within five minute periods the exact time of any sale. The transferring mechanism connecting the hours wheel of the time series operates every 24 hours to effect the movement of one step in the dating series so as to change the numerical designation of the day.

*Time recorder.*—The time recorder (see Figs. 3 and 5) comprises the minutes wheel 31 and the hours and meridian wheel 32. In this connection it may be stated that in the present case the single wheel 32 carries both the hour and meridian characters, the latter being indicated by A. M. and P. M. designations, as distinct from a separate hour and meridian wheel heretofore employed. These latter characters occupy respectively each one-half of the circumference of the wheel, the reason of which will be obvious.

The minutes wheel 31 has a fixed collar 33 (see Figs. 5 and 9) which carries a notched disk 34 that has a slip driving connection with the spur gear 29 whereby the driving power for the registering mechanism is obtained from the spring drum 24. This driving connection comprises a pawl 35 pivotally mounted at 36 to the pinion 29 and normally held in resilient engagement with the disk 34 through the medium of a spring 37, which spring has one end anchored at 38 to the pinion 29. The purpose for this slip driving connection will be presently described. The minutes wheel 31 is under constant tendency to rotate by reason of its gearing connection with the motor 24, but is normally restrained by the escapement controlled through the timing element, as already described.

The minutes wheel 31 carries on its periphery twelve characters indicative of five minute periods of the hour viz. .03, .05, .13, .18, .23, etc. These time intervals are arbitrary, so long as they bear proper relation and adapt the wheel to indicate within five minutes the exact time of sale.

Figure 10:
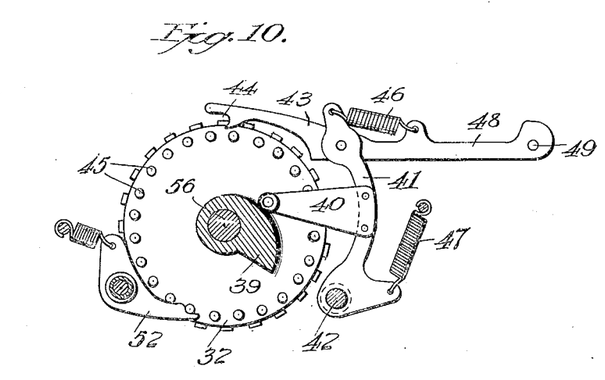
Fig. 10 is a detailed view of the transferring mechanism between the motor driven minute recording disk and the hour and meridian recording disk.
Figure 11:
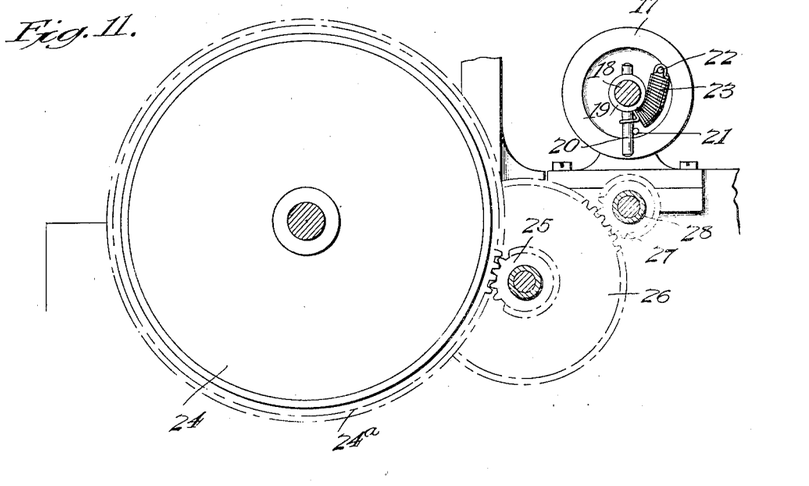
Fig. 11 is a detailed view in side elevation of the recorder driving mechanism.

As will be seen by reference to Fig. 10 the minutes wheel carries on its face opposite the notched disk 34 a cam 39, which cam is of such structure as will cause it to engage the arm 40 of a lever 41, said lever being pivotally mounted on a bar 42 to the machine frame. The lever 41 carries a pivotally mounted pawl 43 designed at one end 44 to engage with the studs 45 of the adjacent hour and meridian wheel. As the pawl is moved backward through the cam and arm engagement (39—40) the pawl end 44 is thrown into position to engage with the pin 45 by the spring 46; and the lever 41 is itself advanced forward, when released by the cam 39, through the agency of the spring 47. This last mentioned operation occurs when the wheel 31 completes the last step of its complete revolution *i. e.*, when it moves from a position in which it represents .58 minutes at the printing point to the position in which it represents .03 in the starting point, and in so doing it effects one step in the revolution of the hour and meridian wheel 32, bringing the proper character of the hour wheel into printing position.

To insure the proper position of the pawl 43 in its transferring action, said pawl has an arm extension 48 provided at its end with a stud 49, which stud (see Figs. 4 and 7) is designed to engage with the inclined under-side of a finger 50 on a bar 51 and on its return movement the stud 49 overrides the upper inclined surface of said finger and in doing so causes the pawl engaging end 44 to be positioned for engaging with the stud 45. In like manner the transferring device between the two next adjacent recording wheels engages with the finger 49$^a$ of the bar 51$^a$. The point 43$^a$, Fig. 10 acts as an arresting stop for wheel 32 to prevent movement of the wheel beyond that prescribed for each operation. 52 is a retaining pawl to prevent the wheel from turning while transfer levers are moving back. The pawls 43 and arms 48 are vertically guided (see Fig. 7) in their movements by the plate 45$^a$ having slots 44$^a$, and the head 45$^a$ having slots 46$^a$.

*Dating means.*—The means for impressing upon the vended articles their date of sale is in the present instance substantially the same as that disclosed in our co-pending applications, which principle is that of utilizing the ordinal numbers of the day in the year for expressing the date of each day. Thus number "1" associated with the word "year" previously printed upon the blank, will indicate that the policy was sold on the first day of the year or January 1st; the number "50" would indicate that the policy had been sold on February 19th, and so on throughout the calendar. To effect this it is necessary to have only three registering wheels, each of which carries the nine digits together with the zero, so that by proper composition of the three wheels any date from 1 to 365 or 366 may be expressed. To this end the dating means in the present invention (see Figs. 3 and 5) comprises a units wheel 53, a tens wheel 54, and a hundredths wheel 55. All of these wheels as well as the hour and meridian wheel 32 are mounted free to rotate upon a common shaft 56; and the means for transmitting the *seriatim* movement of these wheels, and their derived movement from the wheel 32 is the same as that shown in Fig. 10 and set forth with reference to the minutes and hours wheel and need not therefore be further described. It may be stated, however, that this transferring mechanism between the wheels differs only as regards the periods of time when they are to be actuated, thus the hours and meridian wheel 32 carries twenty-four studs 45, since this wheel is to be shifted hourly. The units wheel 53 of the dating mechanism carries on the other hand ten studs since said wheel is to make a complete revolution every ten days, when it in turn actuates the tens wheel once in that period, and the latter wheel in turn moves the hundredths wheel in a like period.

*Recorder releasing mechanism.*—The present machine embodies in its construction a means for releasing the several recording wheels from their respective controlling connections, and also from the influence of the prime mover, the purpose whereof being that the several wheels of the recorder may be set to agree with the time at which the machine is installed, as for instance when the machine is presented for use to the public after a period of inoperativeness. To this end (see Figs. 4 and 5) it is proposed to provide a rod 57 mounted to turn in bearings 58 and having an operating end 59 to permit of its manual actuation. On the other end the rod 57 is shaped to provide a lever 60, the end of which is formed with a hook 61 to engage with a stud 62. The stud 62 is carried by a yoke 63 that is adapted to have vertical movement by a stud 63ª moving within one of the guideways 46ª in the head 45ª. The yoke 63 is adapted to be depressed through the medium of the lever 60 and in doing so said yoke engages with and depresses the arms 48 of the several transferring devices. With arms 58 thus depressed the pawls 44 are moved free of the studs 45, and the arms 40 are moved clear of the cams 39. The minute wheel 31 may itself be freed of its driving connection with the prime motor through the medium of its slip drive above described and shown in Fig. 9. With the several recording disks thus free from their transferring connection the same may be set in accordance with the day of the year and the hour of the day. The several wheels of the recorder may be set at their proper relative angular positions by having the proper characters register with the edge of a marker 65, and for this purpose each of the record disks carries on its periphery a duplicate set of its printing characters so disposed that with the registering of any character with the marker 65, its corresponding printing character is positioned for the printing operation.

Figure 1:
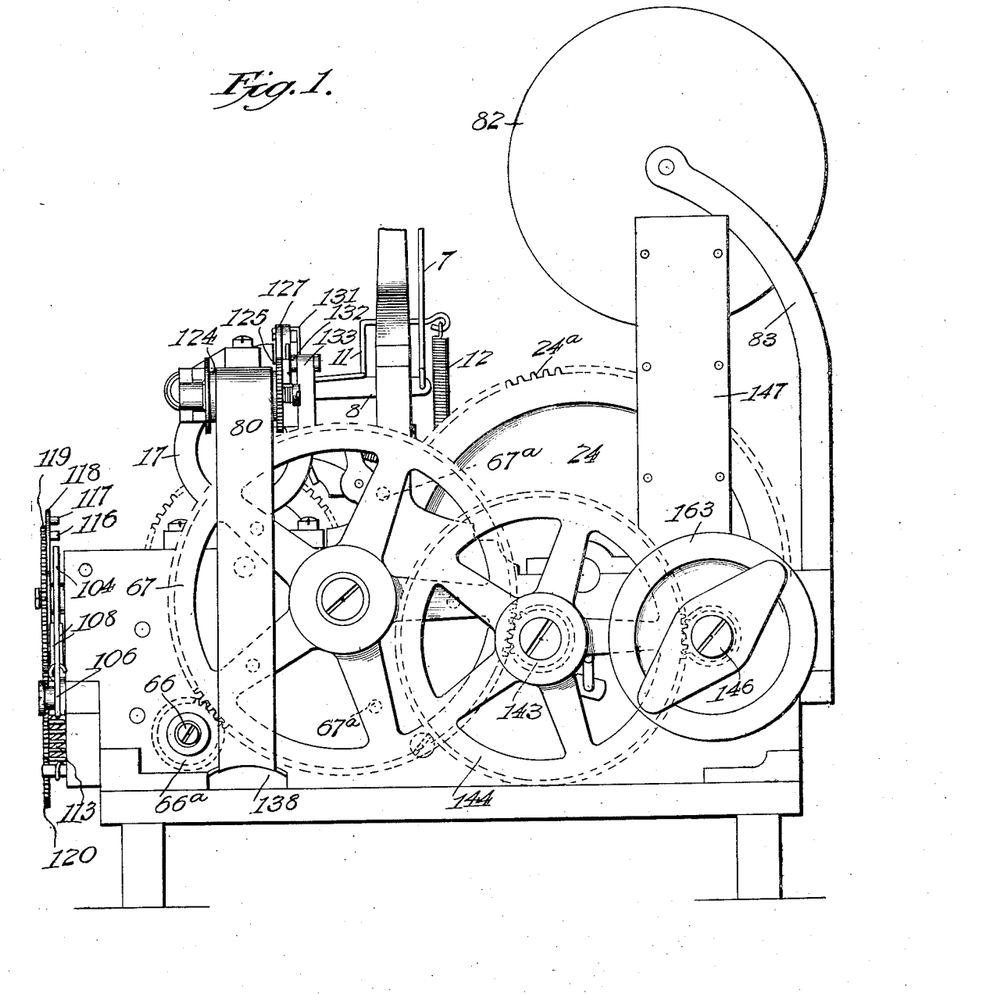
Figure 1 is a side elevation of the machine.
Figure 6:
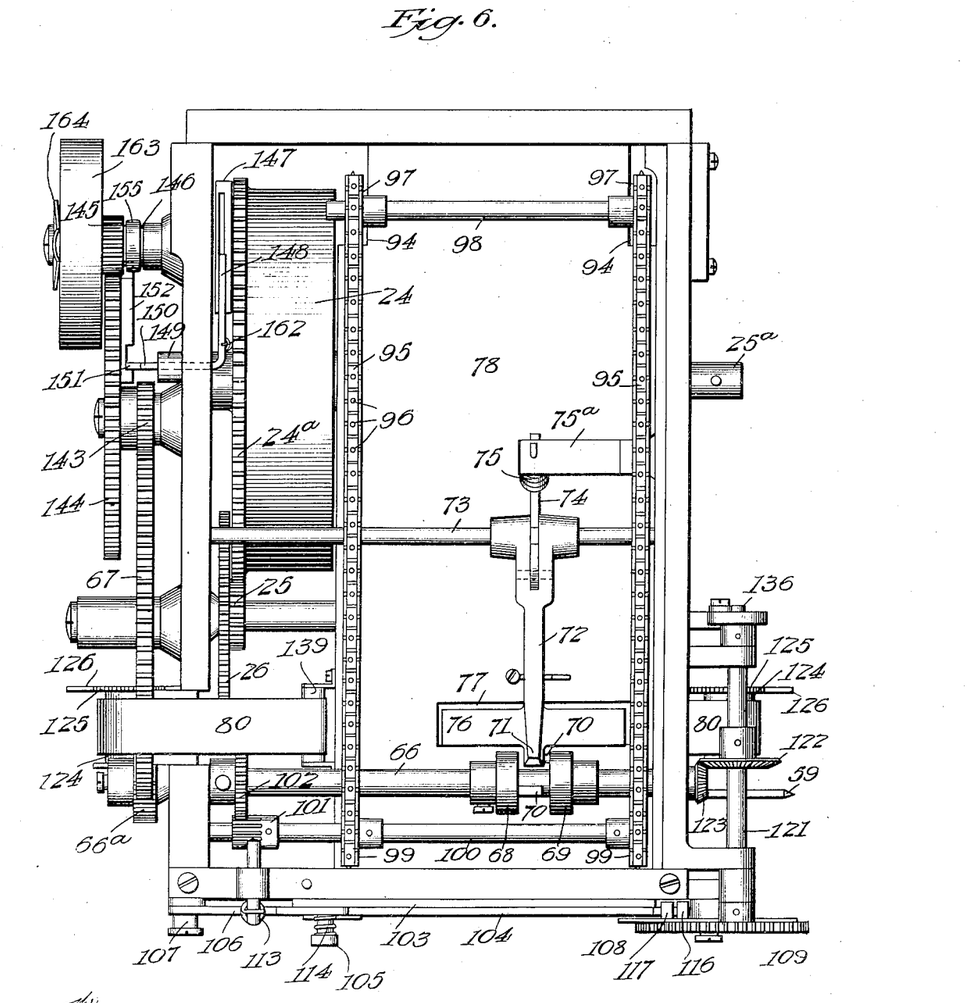
Fig. 6 is a bottom plan view.
Figure 7:
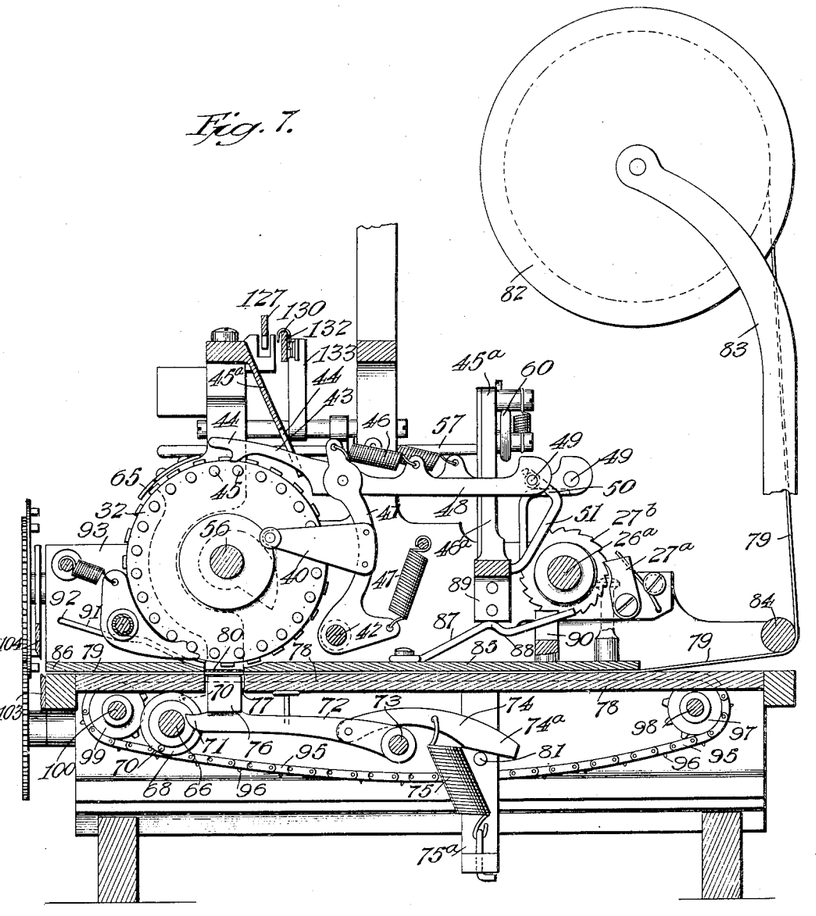
Fig. 7 is a longitudinal sectional view through the entire machine.

*Printing mechanism.*—From the foregoing description it will be seen how the printing characters carried by the several recording wheels are assembled for the purpose of expressing the time or fraction of the day by hours and five minute intervals. The printing operation occurs directly beneath the shaft 56 upon which the recording wheels are mounted, (see Fig. 7). In order to produce impressions from these printing characters upon the policy or other articles vended, a shaft 66 having a pinion 66ª is adapted to be driven one revolution for each article to be vended through the medium of a spur wheel 67, (Fig. 1) which is actuated through the medium of the weight of the purchaser, and whose manner of operation will be described hereinafter. The shaft 66 is provided with a pair of disks 68 and 69 keyed thereon (see Figs. 6 and 7), which disks carry on their inner faces oppositely projecting pins 70. The pins 70 are designed to successively engage with a shoulder 71 of an arm 72 that is mounted to swing on the shaft 73 within the machine frame. The arm 72 is bifurcated to receive a lever 74 that extends over the shaft 73 and connects with an impelling spring 75, which spring is tensioned with the depression of the arm 72, by the pin 70, and on the release of the latter said spring 75 throws the arm 72 upward. The arm 72 carries a platen 76 which works through an opening 77 in the bed plate 78 and forces the web of paper together with the interposed inking ribbon 80 against the printing surface made up of the characters on the recording wheels. In Fig. 7 there is shown the hours and meridian wheel 32 in position for effecting registration. It is desirable to make the impression stroke of the platen 76 in the smallest fraction of time whereby to avoid blurring or smearing of the printed characters since the web of paper 79 is at this moment actually moving. To this end it is proposed to provide a stop 81 on the post 75ª which will engage with the foot 74ª of the lever and thus break the downward pull on this lever and incidentally the upward throw of the arm 72; and since the stop 81 is a fixed one and the lever 74 connects with the arm 72 beyond its fulcrum it will be evident that the tension of the spring 75 tends to pull the arm 72 downward when the members 74ª and 81 engage.

Inasmuch as there are two pins 70 which successively engage the shoulder 71 of the arm 72 and depress the latter during a single revolution of the shaft 66, two imprints are made during each revolution of said shaft. The purpose of this latter operation will be understood when it is considered that the present machine is designed to vend two articles having each the characters whereby one may serve as a positive identification means for the other, and since both impressions are made substantially at the same time, and through the same means, it is obvious that the impressions will be uniform.

*Feeding and delivering mechanism.*—The web of paper 79 is fed from a roll 82 that is supported by the arm 83 and passes around a guiding bar 84 and thence between two confining surfaces which prevent buckling of the strip. These surfaces consist of the bed plate 78 and the top plates 85 and 86. The plate 78 has an opening 77 and the plates 85 and 86 are separated to afford room for the platen 76. The top plate 85 is removable to permit of ready access to the machine, and for holding said plate in place it is provided with a spring 87 having a shoulder 88 which seats against the under side of the cross bar 89 of the machine frame. The spring 87 is held rigid through the medium of a slotted stud 90. The plate 86 is likewise fitted with a spring 91 which engages at one end 92 with the side 93 of the machine frame.

Figure 4:
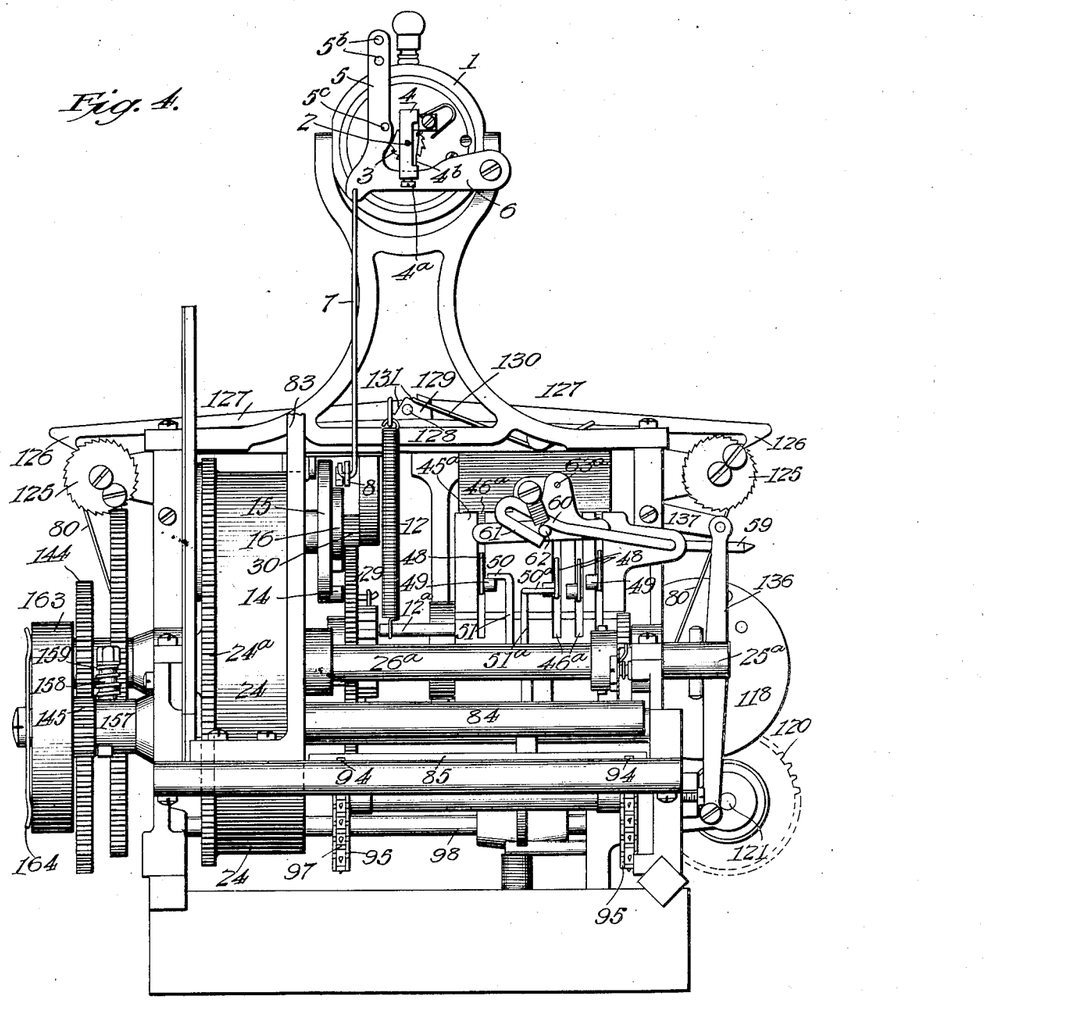
Fig. 4 is a rear elevation.

The upper plates 85 and 86 are recessed as shown at 94, in Fig. 4, to admit endless chains 95 having spurs 96 that extend through marginal perforations in the strip of paper 79 in order to feed the latter at a predetermined rate and to a certain extent. The chains 95 travel around idlers 97 on the shaft 98 and driving sprockets 99 on the shaft 100, which shaft is geared through pinions 101 and 102 from the driving shaft 66. In all other respects the paper feeding mechanism is substantially the same as that shown and described in our other two applications above referred to, and for a more detailed description of the present operation reference may be had to either of the above mentioned disclosures.

*Severing device.*—The paper strip emerges at the front of the machine from between the confining plates 78 and 86 where it passes over the fixed blade 103 of a severing device comprising, in addition to said fixed blade, a movable blade 104 fulcrumed at 105. The blade 104 is connected through the medium of links 108 with an impelling lever 106, pivoted at 107. The links 108 connect the blade 104 and the lever 106 through pins 109, and a third pin 110 acts to seat against and limit the blade 104 in one direction of its movement and against the lever 106 in the reverse movement of said blade. The lever 106 has a projection 111 which coöperates with a heel 112 on the blade 104 which heel is to the opposite side of the blade fulcrum and in their coöperation said projection 111 engages with the heel 112 on the cutting stroke of the blade 104 and effects to break the downward throw of said blade immediately after said blade has cut the strip, and then to restore the blade to its normal position. The lever 106 receives its impelling force from the spring 113, and the blade 104 is provided on its fulcrum 105 with a torsion spring 114.

For tensioning the spring 113 the blade 104 has its free end constructed with a foot 115 along the under edge of which are adapted to ride in succession the pins 116 and 117, carried by the disk 118, and which in their movement cause the blade 104 to be lifted and released for the shearing stroke. The inertia of the blade, however, drives it past the normal position when it executes its stroke causing a re-action of spring 113, thus bringing the projection 111 and the heel 112 into engagement which restores the blade 104 to normal position.

The disk 118 carries a pinion 119 that meshes with a pinion 120 on the shaft 121, which shaft is in turn driven through the beveled gearing 122 and 123 from the shaft 66. Inasmuch as it is also the shaft 66 which effects the feeding on the paper strip, and causes the printing stroke, it will be evident that these latter mentioned operations and the shearing action of the blade 104 will occur in their proper sequence.

*Ribbon mechanism.*—The ribbon mechanism (Figs. 1 to 5) comprises a pair of spools 124 having ratchets 125 that are engaged by the pawls 126 of the arms 127. Said arms 127 are pivotally mounted at 128 to a common oscillating member 129 and through the medium of which the pawls 126 are alternately engaged and disengaged from their respective ratchets. A spring detent 130 engages in notches 131 and holds the oscillating member 129 in either of its set positions. The oscillating member 129 is carried by a reciprocating bar 132 which is supported at either end on upright arms 133 mounted to oscillate on shafts 134, 135, which oscillations are effected by the rotating shaft 121 through the pitman 136 connecting said shaft 121 with an arm 137 that is fixed to the shaft 135. From the spools 124 the ribbon passes about through a guide 138 in the side of the machine frame (see Fig. 1) thence around the guide roller 139, to the guide 140 and across the opening 77 of the bed plate, thence about the guide 141 and through the guide 142 on the opposite side of the machine. From the guide 142 the ribbon is carried to the second spool 124.

When the ribbon is wholly unwound from the spool opposite that upon which it has been wound, the pawls 126 have their positions automatically reversed with respect to the ratchets 125 through the strain on the ribbon in precisely that manner described in application Serial No. 489,457.

*Driving mechanism.*—As heretofore pointed out the recording disks are driven through the medium of the spring motor 24 through the gearing (Fig. 5) 24ª, 25, 26, 27. The spring of the motor 24 is adapted to be wound from the end 25ª of its shaft 26ª. A pawl and ratchet 27ª and 27ᵇ secure the shaft after the spring is wound. The motor is of such type as will insure the operation of the machine for a period of from seven to ten days.

As in the case of the machines disclosed in the aforesaid applications, all of the operating mechanism of the present machine other than that for actuating the recording wheels is adapted to be performed manually viz. through the weight of the purchaser on a movable platform or the operating of a lever. To this end the wheel 67 (Fig. 1) carries on that side adjacent the machine a plurality of studs 67ª which are successively engaged by a hook (not shown). For a further detailed description of the operation of these last mentioned parts, reference may be had to applicants' pending application, Serial No. 465,182 wherein is employed substantially this same arrangement.

*Coin controlled and machine locking means.*—The manual operating mechanism of the present machine is designed to be actuated only when a coin of the prescribed character shall have first been inserted in the machine, thus insuring the machine against trifling by persons other than those who desire to purchase an accident policy. And it is also desirable in the present machine to permit of this manual actuation of the machine only for that period necessary to perform service for the vending of one policy. To these ends the present machine embodies an arrangement which, on the depositing of a coin, releases the mechanism in question and permits of its operation for the necessary period, and at the end of such operation locks the mechanism against further movement or until another coin has been deposited.

The locking and coin controlling means (see Fig. 12) consist of pinions 143, 144 connecting the wheel 67 with a pinion 145 on a stub shaft 146. The stub shaft 146 is located adjacent the coin chute 147, the path of the latter being obstructed by a coin actuated arm 148 (Fig. 6) which is journaled at 149 to the frame of the machine. An arm 150 of the coin guard has a finger 151 which coöperates with a latch 152 that is pivoted on a stud 153 to the wheel 144. The latch 152 has one end 152ª which works between a fixed stop 154 and the finger 151, which constitutes a movable stop; and on its other end 153ª works between a fixed stop 155 and a spring 156, which constitutes a movable stop. The stop 155 is mounted on the bearing 157 of the shaft 146, and a pin 158 having a spring 159 resiliently supports the movable stop 156 on said bearing. A spring 160 connected to the latch keeps the latch ends normally in engagement with the fixed and movable stops 154 and 156, and so long as the finger 151 remains in the path of swinging movement of said latch (see Fig. 12) the wheel 144 is held against movement.

Figure 12:
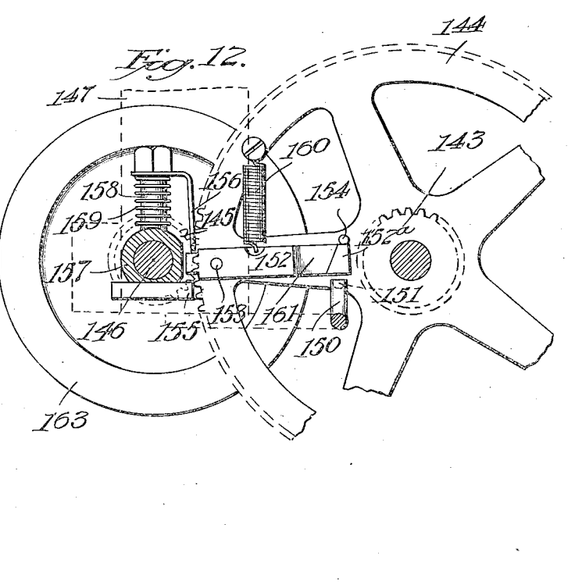
Fig. 12 is a detailed side view of the locking mechanism for the manually operated drive.

Assuming that a coin has been deposited in the chute 147 and has struck and moved the bar 148, said bar brings the finger 151 beneath the cut away portion 161 of the latch whereupon the latter is free to swing past said finger, which it does on the turning of the wheel 144, it being understood that the wheel 144 is under tendency to turn immediately the purchaser stands upon the platform. When the wheel 144 has made a complete revolution, the latch 152 engages with the stop 156, but since this stop is movable the latch is permitted to pass. Having passed the stop 156, the latch end 153ª strikes the fixed stop 155 and holds the wheel 144 against movement, it being understood that the finger 151 is thrown back into its locking position, as soon as the latch 152 has been released therefrom. Said finger 151 and the coin striking bar 148 are returned to their positions by the spring 162, (Fig. 6).

The gearing trains 143, 144 and 145 are loaded by an inertia wheel 163 on the shaft 146, said inertia wheel having a friction drive connection with said shaft through the medium of a presser plate 164 whereby the gearing parts referred to will not be subject to the jarring incident to stopping the momentum developed by the wheel.

No claim is made herein to the cutting and dispensing mechanism, nor the check controlling mechanism, as these form the subject matter of divisional applications.

What is claimed is:—

1. In a time recording mechanism, the combination of disks carrying characters expressive of time, a driving element normally tending to move one of said disks, means for transferring movement from the driven disk to the other disks in *seriatim*, a timing element normally restraining said disks but releasing the same at predetermined intervals, and a means for rendering inoperative the transferring means whereby the disks may be independently adjusted.

2. In a time recording mechanism, the combination of disks carrying characters expressive of time, a driving element, a slip driving connection between said driving element and one of said disks, means for transferring movement from the driven disk to the other disks in *seriatim*, and releasing means for rendering inoperative said transferring means, said releasing means and the slip driving connection permitting of independent adjustment of said disks.

3. In a time recording mechanism, the combination of disks carrying characters expressive of time, a driving element, a slip driving connection between said driving element and one of said disks, means for transferring movement from the driven disk to the other disks in *seriatim*, and a lever for engaging with said transferring means and rendering the same inoperative, said releasing lever and the slip driving connection permitting of independent adjustment of said disks.

4. In a time recording mechanism, the combination of disks carrying characters expressive of time, a driving element having a slip driving connection with and normally tending to move one of said disks, means for imparting movement from the driven disk to the other disks; said slip driving connection comprising a pinion geared to the driving element, a notched disk carried by the driven disk, a spring tensioned pawl carried by said pinion and engaging with the notched disk, and a timing element normally restraining said driving element but releasing the same at predetermined intervals of time.

5. In a time recording mechanism, the combination of disks carrying characters expressive of time, a driving element having a slip driving connection with and normally tending to move one of said disks, means for imparting movement from the driven disk to the other disks; said slip driving connection comprising a pinion having gearing connection with the driving element, a notched disk carried by the driven disk, a pawl carried by the pinion engaging the notched disks, a time recorder escapement having gearing connection with said pinion; and a timing element associated with and permitting the actuation of said recorder escapement at predetermined intervals of time.

6. The combination with a time piece having a toothed wheel, of a lever, a pawl carried by the lever and engaging with and supported by said wheel, a tensioned bar connected with said lever and normally tending to move the lever downwardly, and a recording means controlled by the tensioned bar.

7. In a recording apparatus, the combination of character wheels, a shaft on which said wheels are mounted, a motor normally tending to rotate said wheels, a second shaft disposed adjacent the character wheel shaft, a time controlled recorder escapement mounted on said second shaft, gearing connection between the escapement and character wheels, and an inertia body mounted on the second shaft and normally opposing movement to be transmitted from the motor to the character wheels.

8. The combination with character wheels, of a motor normally tending to rotate said wheels, a time controlled escapement restraining said wheels; said escapement comprising a disk mounted on a shaft and having gearing connection with the motor and character wheels, stops on said disk, an arm associated with the timing element coöperating with said stops and adapted to be engaged by and released therefrom at intervals, and cams on said disk for restoring said arm to operative position when released; and an inertia body mounted coaxially with the disk and normally opposing movement to be transmitted from the motor to the character wheels.

The foregoing specification signed at Dayton Ohio this 17th day of Jany, 1911.

ROBERT B. CRAIG.
ALBERT COFFMAN.

In presence of—
I. A. BRAUM,
H. M. WALSH.